United States Patent [19]

Neal et al.

[11] Patent Number: 4,964,564

[45] Date of Patent: Oct. 23, 1990

[54] ROTATING OR MOVING METAL COMPONENTS AND METHODS OF MANUFACTURING SUCH COMPONENTS

[76] Inventors: Donald F. Neal, 55 Watling Street, Woodside, Hints, England; Michael W. Kearns, 11 Kingscroft Road, Streetly, England, B 76 2HF; Stephen P. Fox, 41 Woodend, Handsworth, England, B20 1EW; James E. Melville, 41A Church Lane, Darley Abbey, England, DE3 1EX; Kenneth W. Wright, 33 Hillsway, Littleover, England, DE3 7DS; Philip S. Wood, 5 Quernmore Drive, Kelbrook, England; John T. Pinder, 3670 Clubland Dr., Marietta, Ga. 30068; Stephen C. Clark, 3946 Camrose Pl., Marietta, Ga. 30062

[21] Appl. No.: 238,266

[22] Filed: Aug. 26, 1988

[30] Foreign Application Priority Data

Aug. 27, 1987 [GB] United Kingdom ............... 8720248

[51] Int. Cl.⁵ .................. B23K 20/08; F02C 7/00; B21K 3/04; B23P 15/04
[52] U.S. Cl. .................. 228/107; 228/109; 228/155; 228/171; 228/175; 228/263.21; 29/889.71; 416/241 R
[58] Field of Search .............. 228/263.21, 263.13, 228/193, 194, 107, 155, 182, 252; 416/241 R, 224; 29/156.8 B, 156.8 H

[56] References Cited

U.S. PATENT DOCUMENTS

| | | | |
|---|---|---|---|
| 3,798,747 | 3/1974 | Lalwaney | 228/107 |
| 4,214,355 | 7/1980 | Zelahy | 29/156.8 B |
| 4,247,254 | 1/1981 | Zelahy | 416/241 R |
| 4,305,998 | 12/1981 | Manty et al. | |
| 4,354,301 | 10/1982 | Takeuchi et al. | 228/243 |
| 4,390,320 | 6/1983 | Eiswerth | 29/156.8 B |
| 4,446,199 | 5/1984 | Gedwill et al. | 416/241 R |

FOREIGN PATENT DOCUMENTS

| | | | |
|---|---|---|---|
| 0008068 | 2/1980 | European Pat. Off. | 228/107 |
| 1531369 | 1/1970 | Fed. Rep. of Germany | 29/156.8 B |
| 3300930 | 7/1984 | Fed. Rep. of Germany | 228/107 |
| 10347 | 1/1978 | Japan | 228/107 |
| 91412 | 8/1978 | Japan | 29/156.8 B |
| 41688 | 3/1983 | Japan | 228/107 |

*Primary Examiner*—Sam Heinrich
*Attorney, Agent, or Firm*—Cushman, Darby & Cushman

[57] ABSTRACT

A rotating or moving metal component such as a blade for a gas turbine engine is made from a composite bar of titanium alloy with the sides of the bar having a surface layer of e.g. nickel which is less likely to ignite in particle form or by frictional heating when present in oxygen or air. After the surface layer has been bonded to the titanium alloy it is then parted to provide sections which extend perpendicularly to the plane of the surface layers. Each parted section may then be machined into a blade with the nickel portion forming the tip of the blade. Alternatively, each parted section may itself form the blade tip by attachment on its titanium alloy side to a blade stem.

8 Claims, 1 Drawing Sheet

U.S. Patent  Oct. 23, 1990  4,964,564
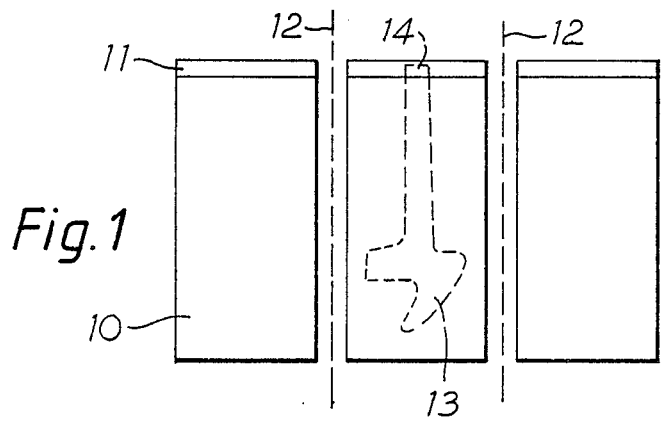
Fig. 1
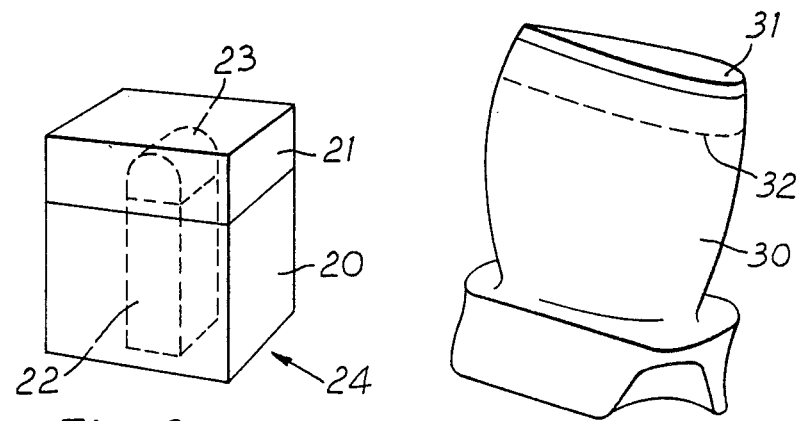
Fig. 2
Fig. 3
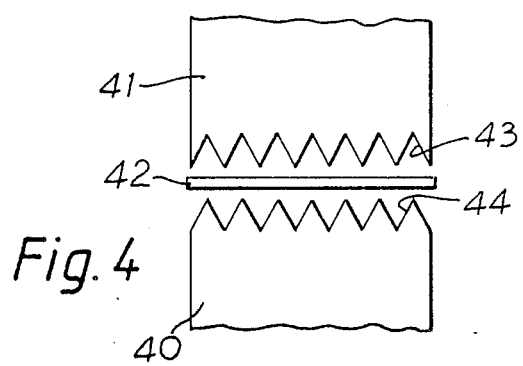
Fig. 4

ROTATING OR MOVING METAL COMPONENTS AND METHODS OF MANUFACTURING SUCH COMPONENTS

BACKGROUND OF THE INVENTION

This invention relates to rotating or moving metal components and methods of manufacturing such components. In particular it is concerned with rotating blades or parts of such blades suitable for gas turbine engines although the invention may be applicable to other types of engines. It may be particularly suitable for application to blades used in the compressor stage of a gas turbine engine. The invention may also be employed for the manufacture of e.g. gears where the teeth are required to be made of steel but where the remainder of the component gear is made of titanium or light alloy to reduce the rotating mass.

Certain kinds of gas turbine engine employ titanium alloy blades and discs in the compressor stage of the engine. The tip of each blade is designed to run in close proximity to a casing or an ablative lining on the casing. During certain aspects of engine operation, contact is possible and in some cases inevitable between the tip of the blades and the casing or its lining. In extreme conditions incidents of this type could result in frictional heating of the tip and the presence of titanium or titanium alloy dust being emitted from the titanium alloy blade tip. Such tip heating and titanium alloy dust emitted from the tip of a blade in a compressor could in theory result in ignition and propagation of fire in the titanium blades themselves.

It is one object of the invention to provide a blade and a method of manufacturing such a blade which would reduce or eliminate the likelihood of such ignition taking place.

SUMMARY OF THE INVENTION

According to one aspect of the invention a method of manufacturing a composite component comprises the steps of creating a composite component with at least one of the sides of the component having a surface layer of material different from the body of the component by bonding said surface layer to said body, parting said component at a plurality of locations to provide sections which extend perpendicularly to the plane of said surface layer, and forging or machining each parted section into a metal component.

Where the component to be manufactured is a rotating blade or part of such a blade e.g. for the compressor or turbine stage of a gas turbine engine, the body of the component is typically a titanium alloy.

The metal component section manufactured in accordance with the invention mat subsequently be attached to another component e.g. by welding the body of the component to the other component. In the case of a blade, the component section may form only the tip portion of the blade, the body of titanium alloy forming part of the component being attached to the stem of a blade of the same or a similar titanium alloy. Typically, the stem would be in its fully heat-treated condition. The attachment could be carried out for example by electron-beam welding or friction welding, and the complete blade would then need to be finish ground or machined to exact shape. The surface layer may be bonded to the titanium alloy or other metal by explosive bonding, diffusion bonding or friction welding or other bonding technique, all of which techniques are known per se, and which if applied in appropriately controlled conditions avoid the formation of significant quantities of intermetallic compounds beyond the boundary with the titanium alloy or other metal. Alternatively, the bonding may be carried out by mechanical working of the component e.g. by extrusion or rolling so as to extend the component in a direction parallel to the plane of the surface layer of material. Once again the working conditions, in particular the extent of heating up of the component, would need to be controlled to prevent the formation of large quantities of intermetallic compounds within the body of the titanium alloy or other metal.

There may be an interlayer present between the surface layer and the body of the component. Such interlayer will be selected such that it tends to resist diffusion of intermetallics from the surface layer of material into the body of the titanium alloy or other metal.

Either or both facing surfaces of the surface layer material and the body may be grooved or similarly machined prior to bonding. If both surfaces are grooved it is preferable that the grooves on one surface substantially intermesh with the grooves on the opposite surface. The interlayer is then placed between the grooved portions and bonding forces the interlayer to adopt a corrugated configuration.

Where the body is a titanium alloy, the surface layer of material is typically nickel or a nickel alloy or one or more of the following elements or their alloys; chromium, cobalt, copper, iron, hafnium, molybdenum, niobium or tantalum.

Where the body is a titanium alloy the interlayer is typically hafnium, molybdenum, niobium or tantalum or a compound of one or more of these materials with other elements. The interlayer may comprise a plurality of layers of such materials e.g. there might be a tantalum alloy layer adjacent the titanium alloy and an iron alloy layer adjacent a nickel alloy tip.

The titanium alloy, the interlayer (if present) and the layer of material may initially be assembled within an external tube or sleeve. Such sleeve may comprise titanium or a titanium alloy or it could comprise copper with a steel interlayer between the copper tube or sleeve and its contents. Such outer tube or sleeve would typically be removed by etching or some similar process prior to the forging or the electro-chemical machining of the parted sections.

It should be stressed that the assembly and mechanical working of the composite material must avoid the possibility of any substantial diffusion from the layer of material into the titanium or titanium alloy, either during heating or heat treatment of the composite material during its processing, or during subsequent service of the component section. The thickness and composition of the intermetallic layer is designed with this consideration in mind.

The titanium alloy may typically be an alloy such as IMI 829 or IMI 834 or titanium 6242 which is in itself designed for application in the high pressure and therefore high temperature region of the compressor.

BRIEF DESCRIPTION OF THE DRAWINGS

Embodiments of the invention will now be described, by way of example only, with reference to the accompanying drawings in which:

FIG. 1 is a schematic side elevation of a component part way through the process of manufacture, FIG. 2 is a schematic isometric view illustrating an alternative component part way through the process of manufacture, FIG. 3 is a schematic isometric view of a gas turbine blade made according to the invention, and FIG. 4 is a schematic view showing one method of bonding a surface layer to the body of a component.

DESCRIPTION OF THE PREFERRED EMBODIMENTS

In FIG. 1, a body 10 of titanium alloy has a surface layer 11 of nickel alloy bonded to it by explosive welding techniques. The composite is parted by known means along lines 12 to provide a plurality of similar semi-finished components or component sections. In dashed outline can be seen the finished blade 13 which is machined from the composite, resulting in a titanium alloy blade having a nickel alloy tip 14. No interlayer is illustrated in FIG. 1, but this is an alternative feature of the process, and would be positioned between surface layer 11 and the body 10.

FIG. 2 is at a larger scale than FIG. 1. It illustrates part of the process for the manufacture of a tip section 23 of a blade and the component 22 shown in dashed line is suitable to be subsequently welded onto the stem of such a blade. A single section 24, parted as shown in FIG. 1, comprises a surface layer 21 of nickel alloy bonded to a body 20 of titanium alloy.

The finished blade shown in FIG. 3 has a stem portion 30 of titanium alloy to which a tip section component 31 has been attached by electron-beam welding along weld line 32. The tip section component 31 results from the finish machining or grinding of a component such as 22 from FIG. 2. The very tip of the blade is composed of nickel alloy as distinct from the remainder of the blade which is of titanium alloy.

A specific bonding technique between a surface layer 41 and a body 40 is shown in FIG. 4. In this example both facing surfaces 43 and 44 of the respective surface layer 41 and the body 40 are grooved such that they would interlock. Interposed between 43 and 44 is an interlayer 42, which when 40 and 41 are forced together e.g. by diffusion bonding, takes up a corrugated aspect between the surface layer 41 and body 40. Another alternative, not illustrated, is to use a pre-corrugated interlayer, in which case only one of the facing surfaces may be grooved.

In a further alternative using explosive bonding, the corrugation of the facing surfaces is produced as part of the interface reaction. Such bonding can be carried out with or without an interlayer.

We claim:

1. A method of manufacturing a composite turbomachinery blade comprising the steps of creating a composite component with at least one of the sides of the component having a surface layer of material different from the body of the component by bonding said surface layer to said body, parting said component at a plurality of locations to provide sections which extend perpendicularly to the plane of said surface layer, forging or machining each parted section into a substantially finished form, each section comprising a surface layer portion and a body portion, and subsequently attaching said section to another component by welding only the body portion of said section to said other component.

2. A method as claimed in claim 1 in which each said section has a body portion of titanium alloy, said body portion being subsequently attached to a blade stem of titanium alloy.

3. A method as claimed in claim 2 in which the section is attached to a titanium alloy stem in the stems fully heat treated condition.

4. A method as claimed in claim 1 in which the surface layer is bonded to the body of the component by explosive bonding.

5. A method as claimed in claim 1 in which the body of the composite is a titanium alloy and the surface layer of material is selected from the group consisting of the following metals or metal alloys: nickel, chromium, cobalt, copper, iron, hafnium, molybdenum, niobium, tantalum and titanium.

6. A method as claimed in claim 1 in which there is an interlayer present between the surface layer and the body of the component, such interlayer being such as to tend to resist the diffusion of intermetallics from the surface layer of material into the body of the component.

7. A method as claimed in claim 6 in which the facing surfaces of the surface layer and the body are grooved prior to bonding to form corrugations in such a manner that the corrugations formed on one surface are adapted to substantially intermesh with the corrugations formed on the opposite surface, the interlayer adopting a corrugated configuration in the bonded composite.

8. A method as claimed in claim 6 in which the body of the composite is made of a titanium alloy and the interlayer is selected from the group consisting of the following materials and alloys of one of these materials with other elements: hafnium, molybdenum, niobium and tantalum.

* * * * *